(12) United States Patent
Yamanaka

(10) Patent No.: US 7,031,110 B2
(45) Date of Patent: Apr. 18, 2006

(54) THIN FILM MAGNETIC HEAD, MAGNETIC HEAD DEVICE AND MAGNETIC RECORDING/REPRODUCING DEVICE

(75) Inventor: Noboru Yamanaka, Chuo-ku (JP)

(73) Assignee: TDK Corporation, Tokyo (JP)

( * ) Notice: Subject to any disclaimer, the term of this patent is extended or adjusted under 35 U.S.C. 154(b) by 150 days.

(21) Appl. No.: 10/667,487

(22) Filed: Sep. 23, 2003

(65) Prior Publication Data

US 2004/0066579 A1 Apr. 8, 2004

(30) Foreign Application Priority Data

Oct. 2, 2002 (JP) .............................. 2002-289953

(51) Int. Cl.
G11B 5/147 (2006.01)
(52) U.S. Cl. ..................................... 360/126
(58) Field of Classification Search ................ 360/126, 360/317, 119, 120, 121, 122, 123, 125
See application file for complete search history.

(56) References Cited

U.S. PATENT DOCUMENTS

| | | | |
|---|---|---|---|
| 4,656,546 A * | 4/1987 | Mallory | 360/110 |
| 4,935,832 A * | 6/1990 | Das et al. | 360/112 |
| 5,438,747 A | 8/1995 | Krounbi et al. | |
| 5,452,164 A | 9/1995 | Cole et al. | |
| 5,600,519 A | 2/1997 | Heim et al. | |
| 5,726,841 A * | 3/1998 | Tong et al. | 360/122 |
| 5,802,700 A * | 9/1998 | Chen et al. | 29/603.14 |
| 6,452,743 B1* | 9/2002 | Sasaki | 360/126 |
| 2002/0176214 A1* | 11/2002 | Shukh et al. | 360/317 |

* cited by examiner

Primary Examiner—Allen Cao
(74) Attorney, Agent, or Firm—Oliff & Berridge, PLC (57) ABSTRACT

A first magnetic film includes a first pole piece, and a second magnetic film includes a second magnetic piece. A gap film is disposed between the first pole piece and the second pole piece. The first magnetic film and the second magnetic film are magnetically joined with each other at a joint as viewed backward from the first pole chip and the second pole chip. A coil film winds vertically around the joint. Third magnetic films are disposed at both sides of the first pole piece or the second pole piece by a given distance.

21 Claims, 8 Drawing Sheets

THIN FILM MAGNETIC HEAD, MAGNETIC HEAD DEVICE AND MAGNETIC RECORDING/REPRODUCING DEVICE

BACKGROUND OF THE INVENTION

1. Field of the Invention

This invention relates to a thin film magnetic head, a magnetic head device and a magnetic recording/reproducing device.

2. Related Art Statement

A composite type magnetic head comprised of a writing element and a reading element with a giant magnetoresistive effective film (hereinafter, called as a "GMR film") is employed as a thin film magnetic head to be utilized in a magnetic disk drive device of a computer memory unit.

As the writing element is employed an inductive type electromagnetic conversion element, which is formed on the reading element. The inductive type electromagnetic conversion element is comprised of a bottom magnetic film, a top magnetic film, a coil film supported by a gap film and an insulating film and the like.

The forefronts of the bottom magnetic film and the top magnetic film are composed of a bottom pole piece and a top pole piece, respectively, which are opposed to each other via the gap film with a minute thickness and whereby writing process is carried out. The bottom magnetic film and the top magnetic film have their respective yoke portions which are magnetically connected at a back joint portion which is located at the rear side from the top pole piece and the bottom pole piece so that the magnetic films complete a magnetic circuit. The coil film is so formed as to wind the back joint portion.

As the GMR film constituting the reading element are typically exemplified a spin valve film (hereinafter, called as a "SV film") and a ferromagnetic tunnel junction film (hereinafter, called as a "TMR film"). The reading element made of the GMR film can realize reading performance of high resolution not depending on the relative velocity for a magnetic disk.

In order to realize high recording performance using such a thin film magnetic head as mentioned above, it is required that the amount of data to be stored in the magnetic disk per unit area (the surface recording density of the magnetic disk) is developed. The high surface recording density can be realized by enhancing the performance of the writing element, the performance of the magnetic recording medium such as the magnetic disk, and the high frequency performance of the writing circuit.

With the writing element, if the gap length between the pole pieces is decreased, the surface recording density can be developed. The decrease of the gap length is restricted on the decrease in magnetic recording intensity between the pole pieces.

With the magnetic disk, if the data track number is increased, the surface recording density can be developed. The track number of the magnetic disk is represented by "TPI" (Track Per Inch). The TPI performance of the writing element can be developed by downsizing the dimension of the writing head to define the data track width. The dimension of the writing head is usually called as a "head track width".

In order to realize high recording density in HDDs to be employed in computers, the track width is narrowed, e.g., to 0.4 µm and 0.3 µm, particularly 0.2 µm at present. With the narrowed track width, it becomes important how to reduce the influence of the magnetic field leaked from the both edges of the pole pieces in the track width direction for the magnetic disk, which is called as "side fringe", in addition to the overwrite performance.

In order to realize the overwrite performance, the pole pieces are made of a high saturated magnetic flux density material and the configurations of the pole pieces are optimized. In order to reduce the side infringe in the track width direction, such a technique is proposed as to match the width of the bottom pole piece to the width of the top pole piece by means of ion beam milling to form the same track width from the bottom pole piece and the top pole piece (cf., Patent Publications No. 1 and No. 2).

For the same sake, such a technique is proposed as to form tapered portions between the zero throat points and the enlarged portions of the bottom magnetic film and the top magnetic film (cf., Patent Publication No. 3).

For the same sake, such a technique is proposed as to set the width of the top yoke portion larger than the width of the top pole piece to project both edges of the top yoke portion from both edges of the top pole piece in the width direction (cf., Patent Publication No. 4)

With the above-mentioned conventional technique, however, if the track width is narrowed to 0.3 µm or below, the adjacent tracks may be erased, so that the side fringe can not be eliminated sufficiently.

Patent Publication No. 1: Japanese Patent Application Laid-open No. 7-262519

Patent Publication No. 2: Japanese Patent Application Laid-open No. 7-225917

Patent Publication No. 3: U.S. Pat. No. 5,600,519

Patent Publication No. 4: U.S. Pat. No. 5,452,164

SUMMARY OF THE INVENTION

It is an object of the present invention to provide a thin film magnetic head, a magnetic head device and a magnetic recording/reproducing device wherein side fringe can be eliminated sufficiently when the track width is narrowed sufficiently, thereby to remove the recording blur therein.

For achieving the above object, a thin film magnetic head according to the present invention comprises at least one writing element which includes a first magnetic film, a second magnetic film, a gap film, a coil film and third magnetic films. The first magnetic film includes a first pole piece, and the second magnetic film includes a second pole piece. The gap film is located between the first pole piece and the second pole piece. The first magnetic film and the second magnetic film are magnetically combined at a joint as viewed backward from the first pole piece and the second pole piece. The coil film winds vertically around said joint. The third magnetic films are disposed at both sides of the first pole piece or the second pole piece by a given distance.

In the thin film magnetic head of the present invention, the first magnetic film and the second magnetic film include the first pole piece and the second pole piece, respectively, and the gap film is disposed between the first pole piece and the second pole piece. The first magnetic film and the second magnetic film are magnetically combined with each other at the joint as viewed backward from the first pole piece and the second pole piece, and the coil film winds vertically around the joint. Therefore, when a writing current is supplied to the coil film to excite the thin film magnetic circuit comprised of the first magnetic film and the second magnetic film and thus, to generate a writing magnetic field at the writing gap formed by the first pole piece, the second pole piece and the gap film, magnetic recording process can be carried out using the writing magnetic field.

The thin film magnetic film head of the present invention is characterized by including the third magnetic films which are disposed at both sides of the first pole piece or the second pole piece by the distance. In this case, therefore, magnetic flux leaked from the coil film, particular the outermost coil turn thereof and magnetic flux leaked from both edges of the first pole piece and the second pole piece can be absorbed into the third magnetic films. As a result, the writing magnetic field can be concentrated and converged into the inherent edges of the pole pieces, so that the side fringe can be reduced sufficiently and the high density recording can be realized.

The distance (minimum distance) between the third magnetic film and the first or the second magnetic film is preferably set within 1.5–6 μm. With this range of the distance, the side fringe magnetic field can be reduced small to 2.5(kOe) or below which is reported to satisfy general condition for reducing side fringe, and thus, the side fringe can be reduced sufficiently.

The third magnetic films can be formed at any position in any structure and any shape only if it can absorb the magnetic flux leaked from the coil film, particularly, the outermost coil turn thereof and the magnetic flux leaked from both edges of the first pole piece and the second pole piece. For example, the third magnetic film may be disposed between the medium opposing surface and the outermost coil turn of the coil film or may be so disposed as to cover the coil film. The third magnetic film may be divided and disposed around the coil film.

The thin film magnetic head may comprise a reading element, in addition to the writing element. For high density recording, the reading element is made of a GMR film such as an SV film and TMR film.

This invention also relates to a magnetic head device comprised of the above-mentioned thin film magnetic head and a head supporting device. Moreover, this invention relates to a magnetic recording/reproducing device comprised of the magnetic head device and the magnetic recording medium. Other objects, configurations and advantages will be described in detail hereinafter, with reference to the accompanying drawing. It is to be understood that the invention is not intended to be limited to the following specific embodiments.

BRIEF DESCRIPTION OF THE DRAWINGS

For a better understanding of this invention, reference is made to the attached drawings, wherein.

DETAILED DESCRIPTION OF PREFERRED EMBODIMENTS

1. Thin Film Magnetic Head

Figure 1:
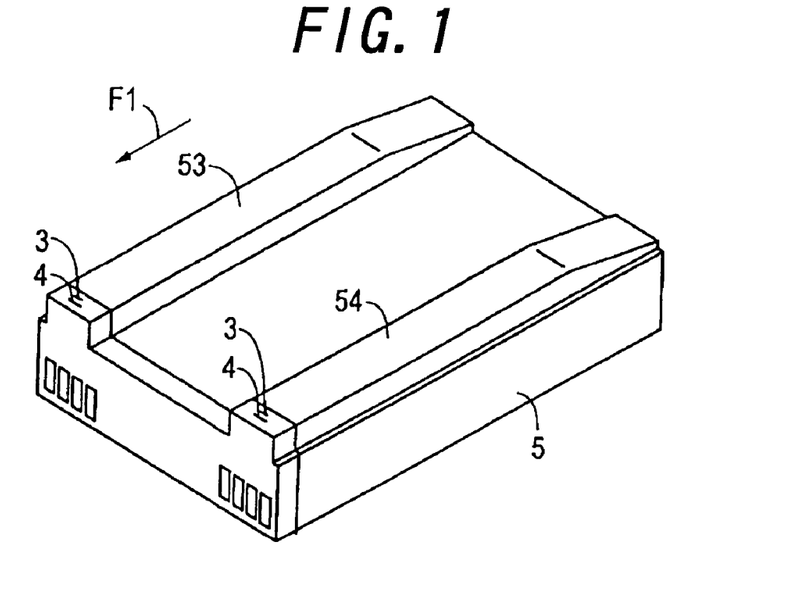
FIG. 1 is a perspective view showing a thin film magnetic head according to the present invention.
Figure 2:
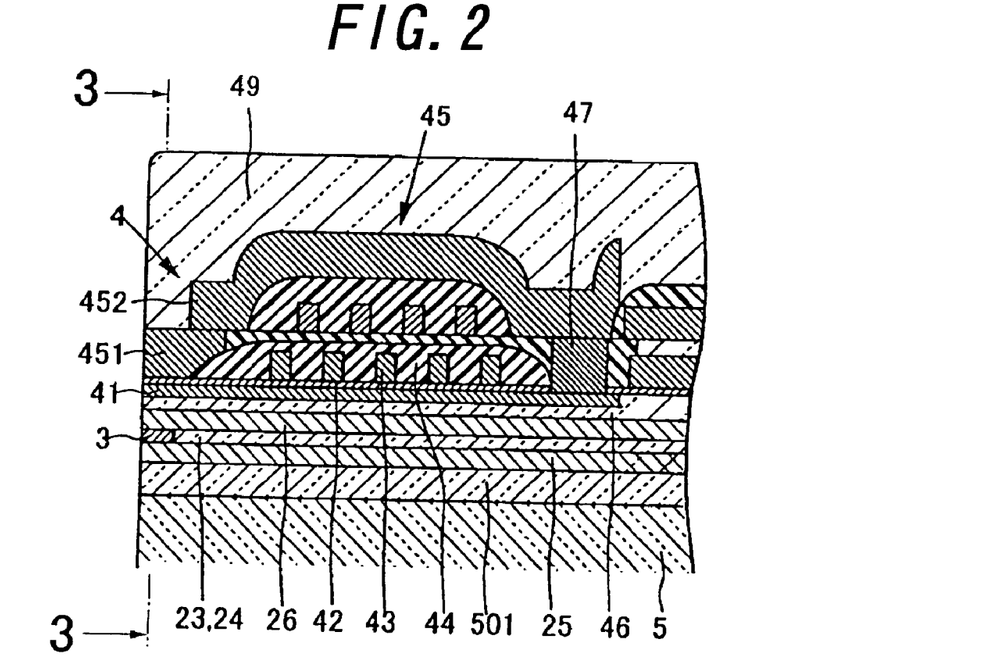
FIG. 2 is an enlarged cross sectional view showing the thin film magnetic head in FIG. 1.
Figure 3:
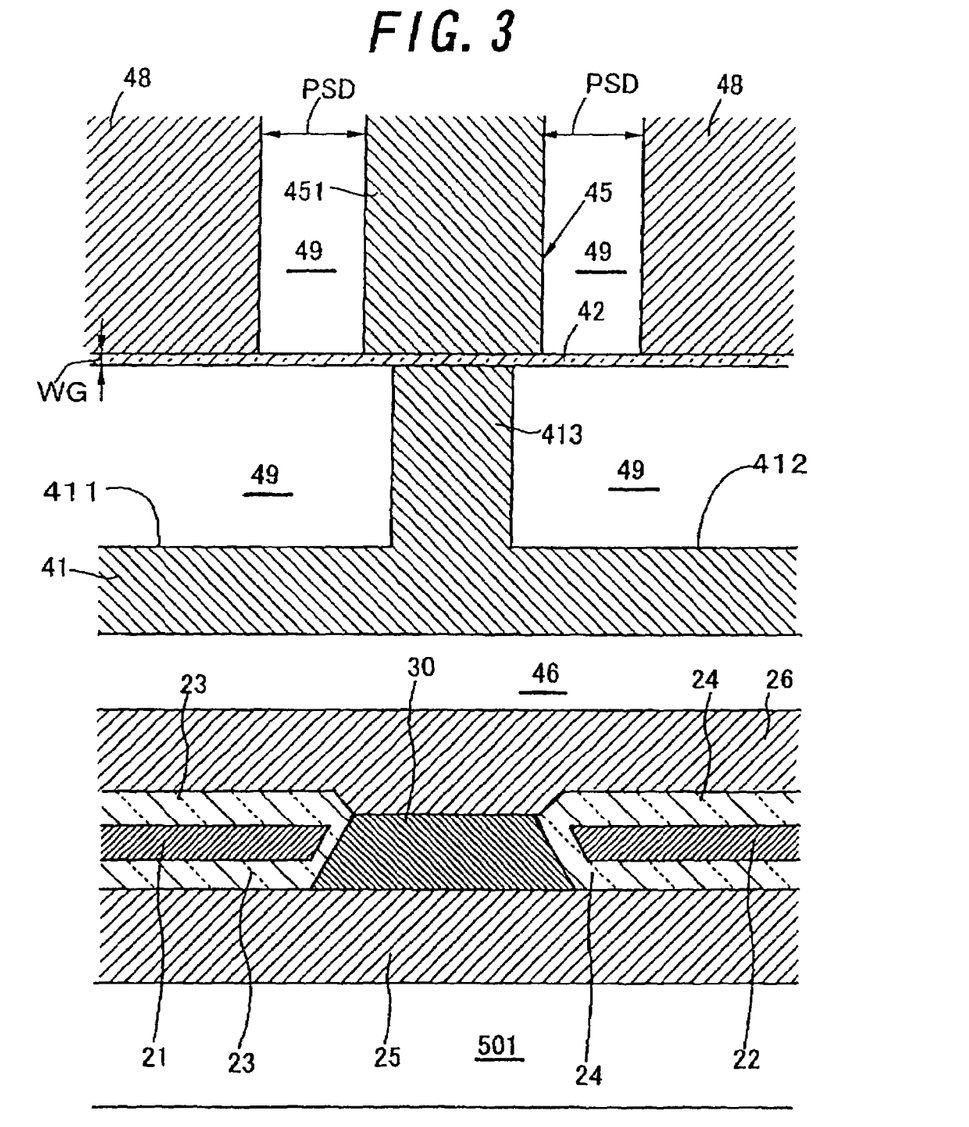
FIG. 3 is an enlarged cross sectional view showing the thin film magnetic head in FIG. 2, taken on line "3—3"
Figure 4:
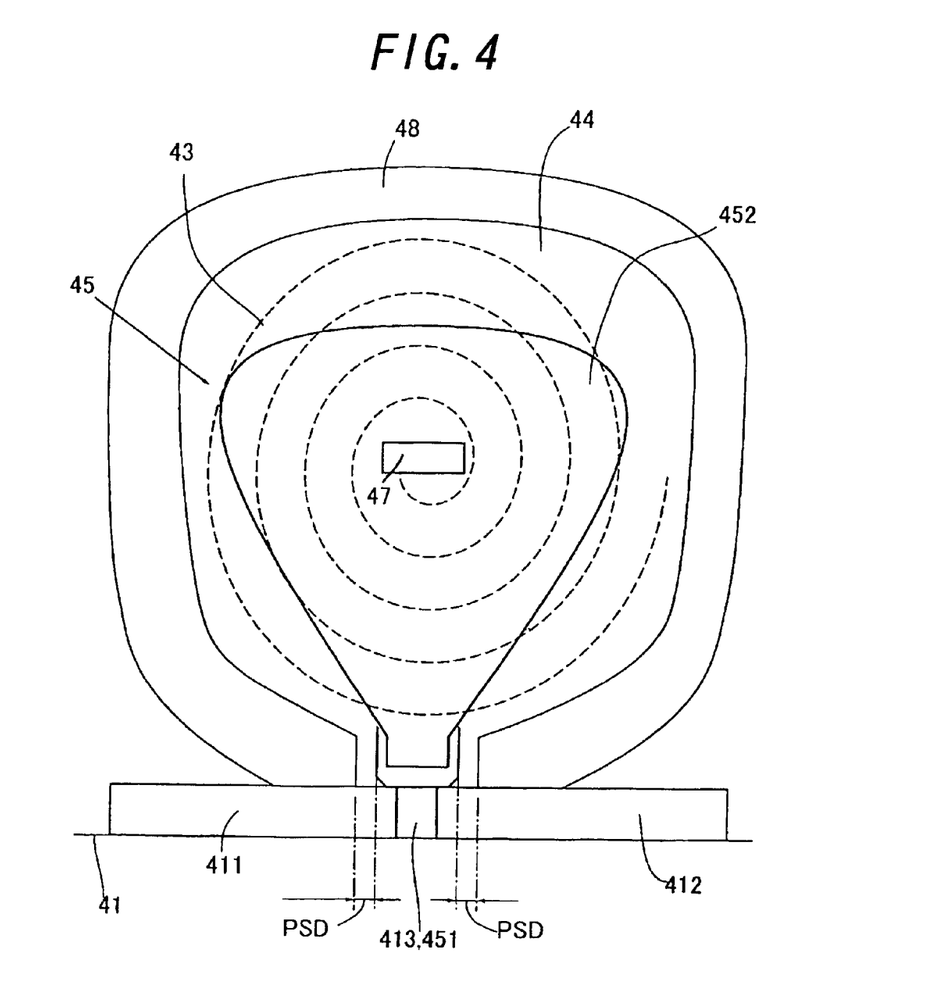
FIG. 4 is an enlarged plan view showing the writing element of the thin film magnetic head in FIGS. 1–3.

FIG. 1 is a perspective view showing a thin film magnetic head according to the present invention, and FIG. 2 is an enlarged cross sectional view showing the thin film magnetic head in FIG. 1. FIG. 3 is an enlarged cross sectional view showing the thin film magnetic head in FIG. 2, taken on line "3—3", and FIG. 4 is an enlarged plan view showing the writing element of the thin film magnetic head in FIGS. 1–3, and FIG. 5 is an enlarged perspective view showing the pole portions of the thin film magnetic head in FIGS. 1–4. In this embodiment, a composite type thin film magnetic head, comprised of a writing element 4 and a reading element 3, is shown. The writing element 4 and the reading element 3 are formed on a base 5 to be employed as a slider, and the forefronts of the elements 3 and 4 are located at the air bearing surfaces (hereinafter, called as "ABS"s) 53 and 54 of the thin film magnetic head, respectively, which are opposite to a magnetic recording medium. The arrow F1 designates a rotative direction of the magnetic recording medium (air flowing direction).

The writing element 4 is comprised of an inductive type thin film magnetic conversion element, which is formed on the reading element 3. The writing element 4 includes a first magnetic film 41, a gap film 42, a second magnetic film 45 and a coil film 43. The first and second magnetic films 41 and 45 may be made of permalloy.

The first magnetic film 41 includes two notch portions 411 and 412, and a first pole piece 413. The notch portions 411 and 412 are separated from each other by a distance PW1 on the same plane level. The first magnetic film 41 is formed in plane except the notches 411 and 412.

The first pole piece 413 is defined by the distance PW1 between the notches 411 and 412. In this embodiment, the distance PW1 constitutes the writing track width, so will be called as a "track width PW1". The notches 411 and 412 are formed precisely by means of ion milling, reactive ion etching, etc.

One surface of the gap film 42 is adjacent to the first pole piece 413. The gap film 42 may be made of metallic oxide such as $Al_2O_3$ and $SiO_2$, or nitride such as AlN, BN and SiN. The gap film 42 may be also made of conductive non-magnetic material such as Au, Cu and NiP.

The second magnetic film 45 includes a second pole piece 451 which is adjacent to the other surface of the gap film 42. The width of the second pole piece 451 is defined as a "track width PW2". In this embodiment, the track width PW2 relating to the second pole piece 451 is set larger than the track width PW1 relating to the first pole piece 413. The second magnetic film 45 includes a yoke piece 452, of which one edge is continuously combined with the second pole piece 451 and of which the other edge is elongated as viewed backward from the forefront of the second pole piece 451 to be opposite to the magnetic recording medium and magnetically combined with the first magnetic film 41 at a back joint portion 47.

The first pole piece 413, the second pole piece 451 and the gap film 42 are located on the same plane level, and the forefronts of the pieces 413 and 451 and the film 42 constitute a medium-opposing surface.

The coil film 43 excites the thin film magnetic circuit comprised of the first magnetic film 41, the second magnetic film 45 and the gap film 42. The coil film 43 is supported by an insulating film 44 and wound around the back joint portion 47. In this embodiment, although the coil film 43 is formed in two layer, it may be in single layer or in multi-layer. The coil film 43 may be made of conductive material containing Cu as its main component.

The second magnetic film 45 includes a yoke piece 452, of which one edge is continuously combined with the second pole piece 451 and of which the other edge is elongated backward from the front edge constituting the medium-opposing surface and magnetically combined with the first magnetic film 41 at the back joint portion 47. In this embodiment, in this way, the pole pieces and the yoke piece are separated to constitute a stitch type thin film magnetic head. Reference numeral "49" designates a protective film to cover the resultant thin film magnetic head assembly entirely. The protective film is made of $Al_2O_3$, $SiO_2$ or the like.

The reading element 3 is preferably made of a GMR film. In this embodiment, the reading element 3 is composed of a GMR film 30, magnetic domain-controlling films 21 and 22, a first magnetic shielding film 25 and a second magnetic shielding film 26. The GMR film includes a free layer to respond to an external magnetic field, and the magnetic domain-controlling films 21 and 22 are positioned at both sides of the GMR film 30 in the width direction to control the magnetic domains of the free layer. In this embodiment, the magnetic domain-controlling films 21 and 22 are made of hard magnetic film (magnet) such as CoCrPt film and CoPt film or anti-ferromagnetic film. The magnetic domain-controlling films 21 and 22 are embedded in insulating layers 23 and 24.

A first magnetic shielding film 25 is so formed as to be adjacent to one surface of the GMR film 30 in the thickness direction, and a second magnetic shielding film 26 is so formed as to be adjacent to the other surface of the GMR film 30 in the thickness direction. The first shielding film 25 is supported by an insulating film 501 provided on the base (slider) 5.

The GMR film 30 includes a first electrode film 25 and a second electrode film 26 for supplying a sense current thereto. The first electrode film 25 is adjacent to one surface of the GMR film 30 in the thick direction, and the second electrode film 26 is adjacent to the other surface of the GMR film 30 in the thickness direction. The GMR film 30 can be made of a ferromagnetic tunnel junction film (TMR film) or a CPP-type spin valve film (SV film) to flow a sense current perpendicular thereto.

In this embodiment, the first electrode film 25 also serves as the first magnetic shielding film 25 and the second electrode film 26 also serves as the second magnetic shielding film 26. Therefore, the resultant shield gap in the thin film magnetic head can be minimized to realize high density recording. In the use of both the electrode film and the shielding film, the films 25 and 26 may be made of CoFe, NiFe, CoNiFe and the like. The second electrode film 26 is adjacent to the first magnetic film 41 via an insulating film 46.

In this embodiment, the gap film 42 is disposed between the first pole piece 413 and the second pole piece 451, and the forefronts of the first pole piece 413, the second pole piece 451 and the gap film 42 constitute the medium opposing surface, and the coil film 43 excites the thin film magnetic circuit comprised of the first magnetic film 41, the second magnetic film 45 and the gap film 42. Therefore, when a writing current is supplied to the coil film 43 to excite the thin film magnetic circuit and thus, to generate a writing magnetic field at the writing gap formed by the first pole piece 413, the second pole piece 451 and the gap film 42, magnetic recording process can be carried out using the writing magnetic field.

Figure 5:
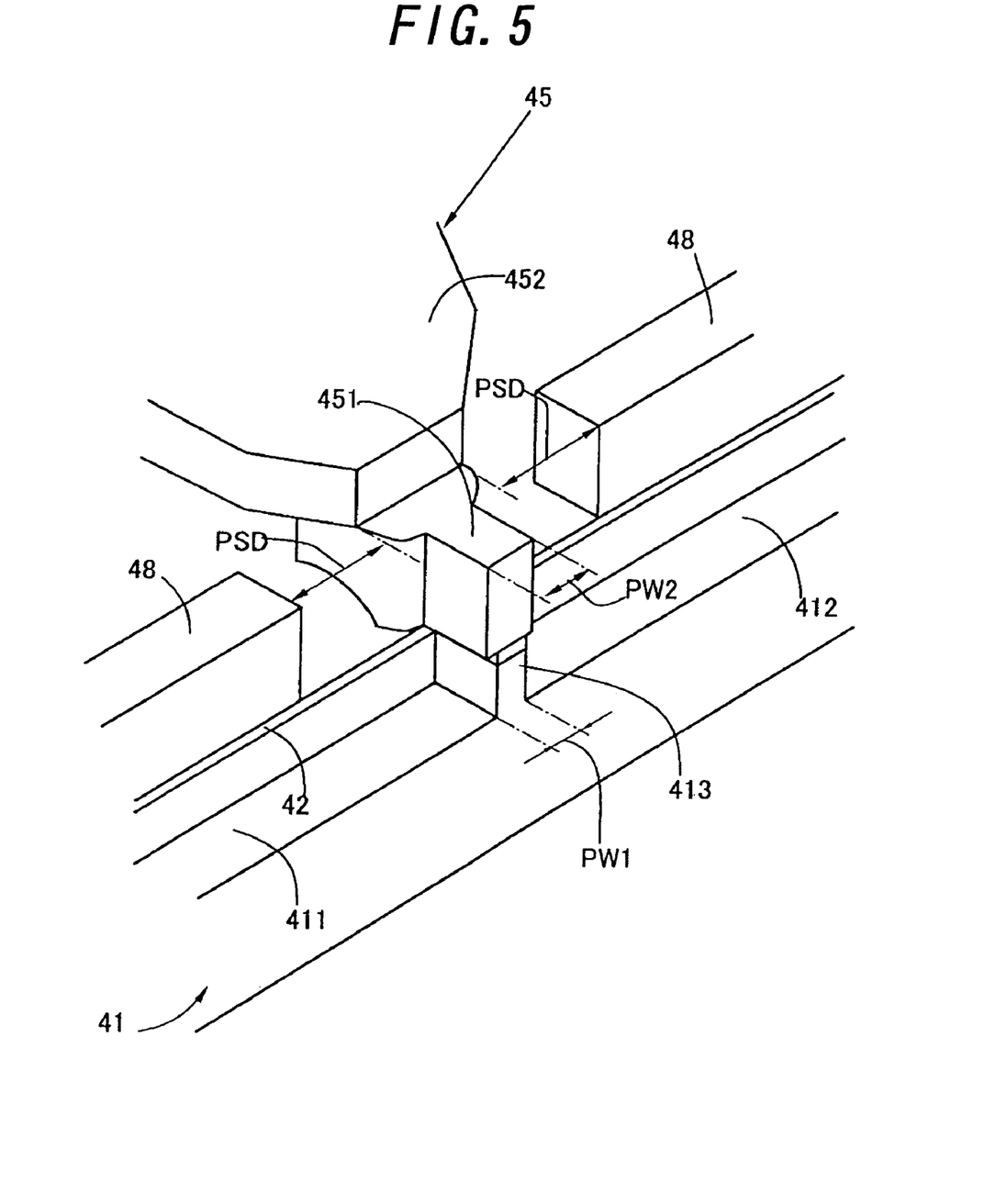
FIG. 5 is an enlarged perspective view showing the pole portions of the thin film magnetic head in FIGS. 1–4.

The illustrated thin film magnetic head of the present invention is characterized by including third magnetic films 48 located at both sides of the first pole piece 413 or the second pole piece 451 by the distance PSD. In this case, therefore, magnetic flux leaked from the coil film 43, particular the outermost coil turn thereof and magnetic flux leaked from both edges of the first pole piece 413 and the second pole piece 451 can be absorbed into the third magnetic films 48. As a result, the writing magnetic field can be concentrated and converged into the inherent edges of the pole pieces, so that the side fringe can be reduced sufficiently and the high density recording can be realized.

In this embodiment, the third magnetic films 48 are formed on the insulating film 42 provided over the first magnetic film 41. The distance PSD is defined by the minimum distance between the first pole piece 413 and the second pole piece 451. In this embodiment, since the second pole piece 451 is formed so widely as to project from both edges of the first pole piece 413, the distance PSD is defined by the distance between the second pole piece 451 and the third magnetic films 48.

The distance PSD is preferably set within 1.5–6 µm. In this case, the side fringe magnetic field can be reduced small to 2.5(kOe) or below which is reported to satisfy general condition for reducing side fringe, and thus, the side fringe can be reduced sufficiently.

Figure 6:
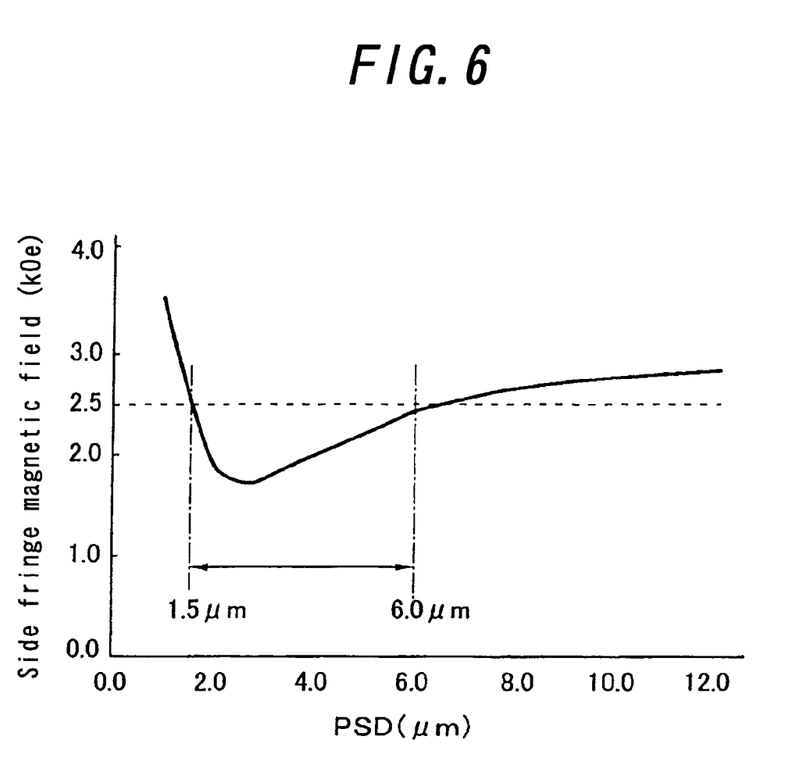
FIG. 6 is a graph showing the relation between the distance PSD and the side fringe magnetic field on simulation data.

FIG. 6 is a graph showing the relation between the distance PSD and the side fringe magnetic field on simulation data. In FIG. 6, the abscissa axis designates the distance PSD (µm), and the ordinate axis designates the side fringe magnetic field (kOe).

As mentioned above, it is reported that if the side fringe magnetic field is reduced to 2.5 kOe or below, the reducing condition of side fringe can be satisfied. In this point of view, it is apparent from FIG. 6 that if the distance PSD is set within 1.5–6 µm, the side fringe magnetic field can be reduced small to 2.5 kOe or below, so that the side fringe can be reduced sufficiently. If the distance PSD is smaller than 1.5 µm, the side fringe magnetic field is increased remarkably to 2.5 kOe or over. If the distance PSD is larger than 6 µm, the side fringe magnetic field is increased to 2.5 kOe or over. In the latter cases, the resultant thin film magnetic head can not be practically employed. Therefore, it is desired that the distance PSD is set within 1.5–6 µm. In another case, the distance PSD may be preferably set to another range.

The third magnetic films 48 can be formed at any position in any structure and any shape only if it can absorb the magnetic flux leaked from the coil film 43, particularly, the outermost coil turn thereof and the magnetic flux leaked from both edges of the first pole piece 413 and the second pole piece 451.

As is apparent from FIG. 4, in this embodiment, the third magnetic films 48 are located between the medium opposing surface and the outermost coil turn of the coil film 43. Also, the third magnetic films 48 are so formed as to enclose the coil film 43. Not illustrated, the third magnetic films 48 may be divided and disposed around the coil film 43.

Figure 7:
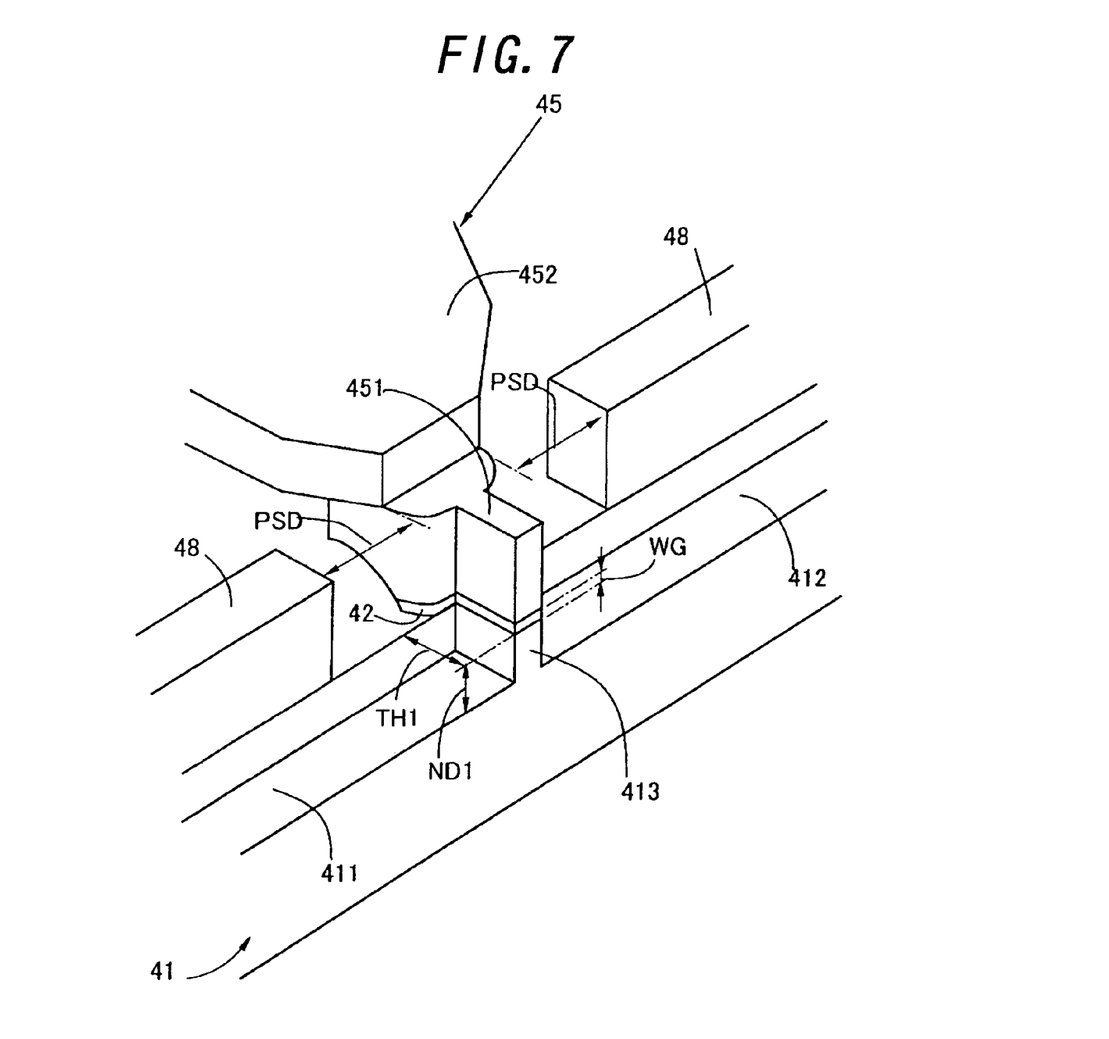
FIG. 7 is an enlarged perspective view showing the pole portions of another thin film magnetic head according to the present invention.

FIG. 7 is an enlarged perspective view showing the pole portions of another thin film magnetic head according to the present invention. In this figure, like reference numerals are given to like components to the ones illustrated in FIG. 4 relating to the above-mentioned embodiment. Therefore, detail explanation for like components will be omitted. In this embodiment, the third magnetic films 48 are formed directly on the first magnetic film 41, so the same function as the above-mentioned embodiment relating to FIGS. 1–5 can be exhibited.

2. Magnetic Head Device

Figure 8:
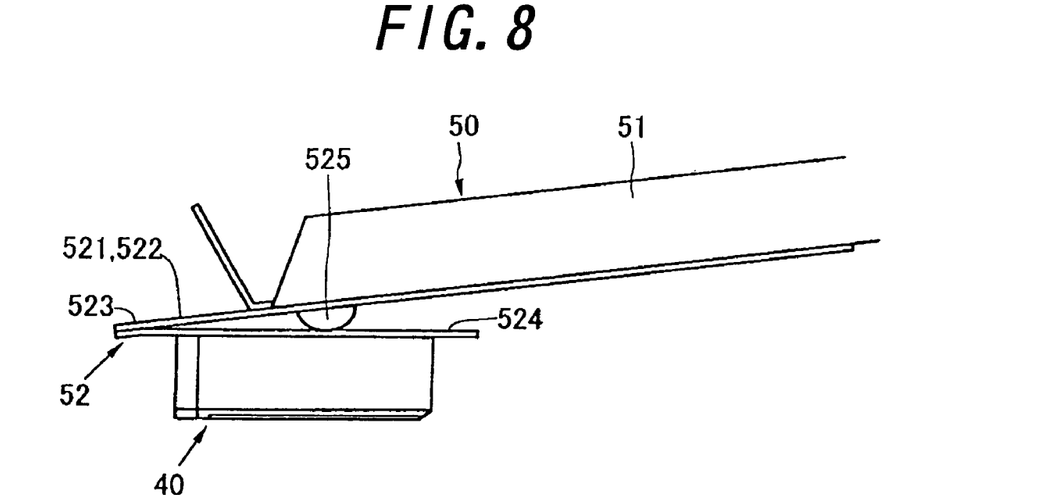
FIG. 8 is an elevational view showing a magnetic head device according to the present invention.
Figure 9:
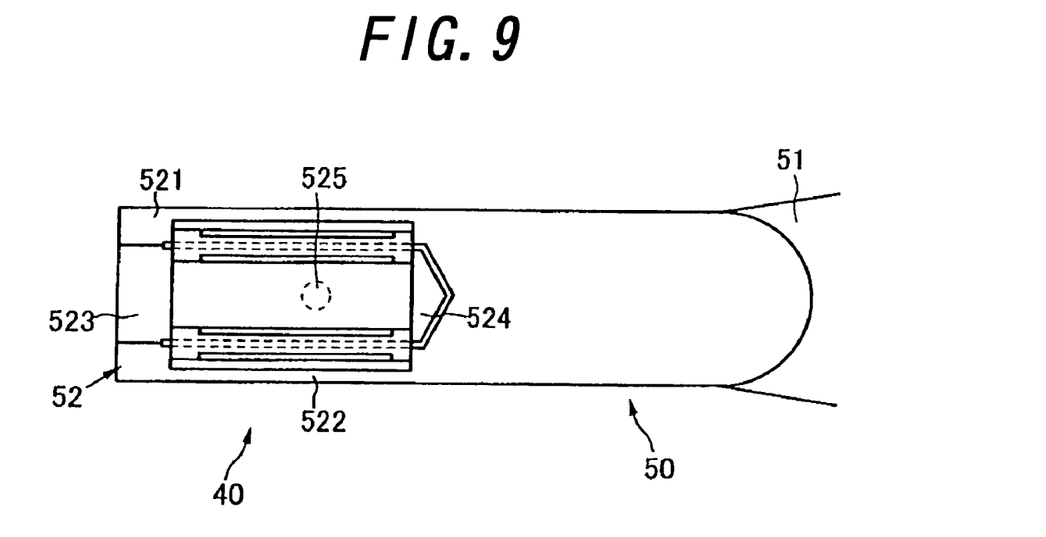
FIG. 9 is a bottom plan view of the magnetic head device in FIG. 8.

FIG. 8 is an elevational view showing a magnetic head device according to the present invention, and FIG. 9 is a bottom plan view of the magnetic head device in FIG. 12. The illustrated magnetic head device includes a thin film magnetic head 40 as shown in FIGS. 1–7, and a head supporting device 50. The head supporting device 50 is comprised of a supporter 51 made of a metallic plate and a flexibler 52 made of a metallic plate provided on the free edge of the supporter 51 in its longitudinal direction. The thin film magnetic head 40 is attached on the lower surface of the flexibler 52.

The flexibler 52 has two outerframes 521 and 522 substantially parallel to the supporter 51 in its longitudinal direction, a lateral frame 523 to join the outerframes 521 and 522 in the remote portion thereof from the supporter 51, and a tongue shaped member 524, of which the forefront is free, extending substantially parallel to the outerframes 521 and 522 from the almost central portion of the lateral frame 523. The other edge of the tongue shaped member 524 is attached to the free edge of the supporter 51 by means of welding or the like.

On the lower surface of the supporter 51 is provided a hemispheric loading convex portion 525, which conducts a load to the tongue shaped member 524 from the free edge of the supporter 51.

The thin film magnetic head 40 is attached to the lower surface of the tongue shaped member 524, and may be pitch-driven and roll-driven.

The present invention is not limited to the above-mentioned magnetic head device, but applicable for any kind of magnetic head device proposed previously or to be proposed in future. For example, the supporter 51 and the tongue shaped member 524 may be combined with a flexible polymer wiring plate such as TAB tape. Also, a magnetic head device of gimbal structure well known may be employed.

3. Magnetic Recording/Reproducing Device

Figure 10:
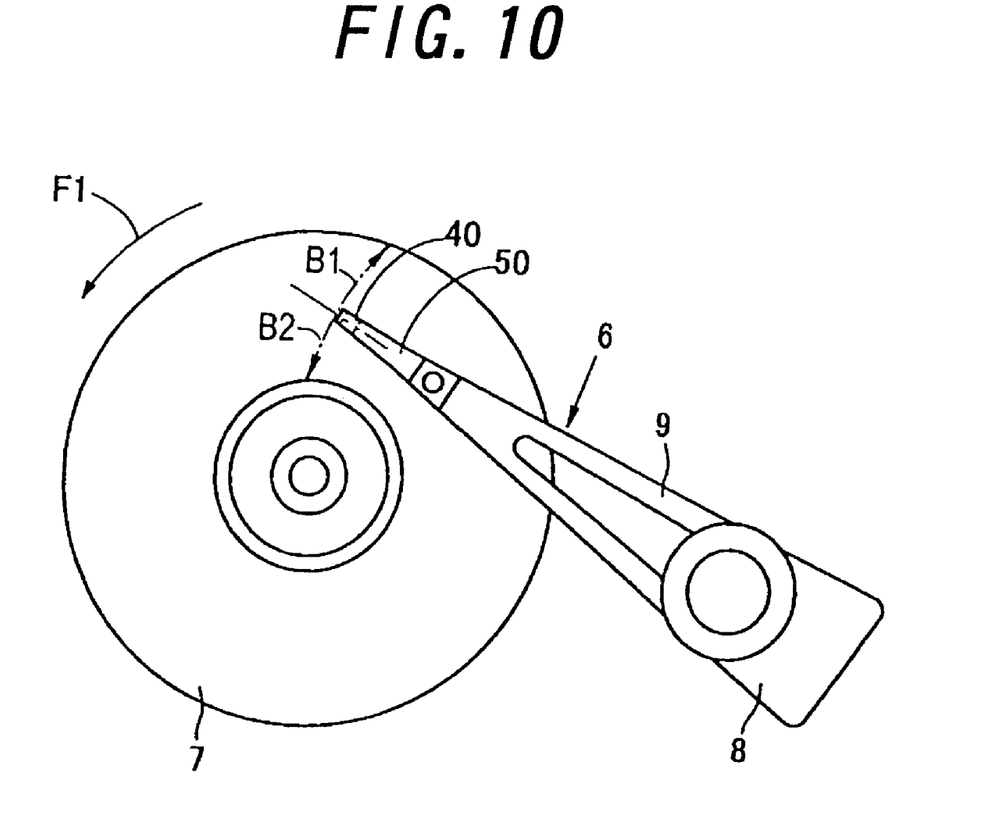
FIG. 10 is a plan view showing a magnetic recording/reproducing device according to the present invention.

FIG. 10 is a plan view showing a magnetic recording/reproducing device according to the present invention. The illustrated magnetic recording/reproducing device includes a magnetic head device 6 as illustrate in FIGS. 8 and 9, a position determining device 8 and a magnetic disk 7. The position determining device 8 is driven on the principle of rotary actuator system, and supports the other edge of the head supporting device 50.

In this embodiment, the magnetic disk 7 is rotated at high velocity in the direction designated by the arrow "F1" by means of not shown rotation driving mechanism with cooperated with the magnetic head device 6.

The thin film magnetic head 40 is driven in the direction designated by the arrow "B1" or "B2" by the head supporting device 50, an arm 9 and the position determining device 8, thereby to perform magnetic recording and reproducing for the magnetic disk 7.

In this case, the side fringe from the thin film magnetic head 40 can be reduced, and thus, the recording blur due to the leaked magnetic field for the magnetic disk 7 can be eliminated.

Although the present invention was described in detail with reference to the above examples, this invention is not limited to the above disclosure and every kind of variation and modification may be made without departing from the scope of the present invention.

As mentioned above, according to the present invention, a thin film magnetic head, a magnetic head device and a magnetic recording/reproducing device can be provided, which can eliminate side fringe sufficiently when the track width is narrowed sufficiently, thereby to remove the recording blur therein.

What is claimed is:

1. A thin film magnetic head comprising at least one writing element,
   said writing element including a first magnetic film, a second magnetic film, a gap film, a coil film and third magnetic films,
   said first magnetic film including a first pole piece,
   said second magnetic film including a second pole piece,
   said gap film being located between said first pole piece and said second pole piece,
   said first magnetic film and said second magnetic film being magnetically combined at a joint as viewed backward from said first pole piece and said second pole piece,
   said coil film winding vertically around said joint, and
   said third magnetic films being disposed at both sides of said first pole piece or said second pole piece by a given distance,
   wherein said third magnetic films are disposed between a medium opposing surface of the thin film magnetic head and an outermost coil turn of said coil film, and said distance is set within 1.5–6 μm.

2. The thin film magnetic head as defined in claim 1, wherein said third magnetic films are divided.

3. The thin film magnetic head as defined in claim 1, further comprising a reading element comprised of a giant magnetoresistive effective film.

4. A magnetic head device comprising a thin film magnetic head as defined in claim 1 and a head supporting device to support said thin film magnetic head.

5. A magnetic recording/reproducing device comprising a magnetic head device as defined in claim 4 and a magnetic recording medium to be magnetically written and read with cooperated with said magnetic head device.

6. The thin film magnetic head as defined in claim 1, further comprising a reading element comprised of a giant magnetoresistive effective film.

7. The thin film magnetic head as defined in claim 2, further comprising a reading element comprised of a giant magnetoresistive effective film.

8. A magnetic head device comprising a thin film magnetic head as defined in claim 2 and a head supporting device to support said thin film magnetic head.

9. A magnetic head device comprising a thin film magnetic head as defined in claim 3 and a head supporting device to support said thin film magnetic head.

10. The thin film magnetic head as defined in claim 1, wherein:
    the first pole piece, the second pole piece and the gap film are located on a same plane level; and
    forefronts of the first pole piece, the second pole piece and the gap film constitute the medium opposing surface.

11. A thin film magnetic head comprising at least one writing element,
  said writing element including a first magnetic film, a second magnetic film, a gap film, a coil film and third magnetic films,
  said first magnetic film including a first pole piece,
  said second magnetic film including a second pole piece,
  said gap film being located between said first pole piece and said second pole piece,
  said first magnetic film and said second magnetic film being magnetically combined at a joint as viewed backward from said first pole piece and said second pole piece,
  said coil film winding vertically around said joint,
  said third magnetic films being disposed at both sides of said first pole piece or said second pole piece by a given distance, wherein said third magnetic films are so disposed as to cover said coil film.

12. The thin film magnetic head as defined in claim 11, wherein said distance is set within 1.5–6 µm.

13. The thin film magnetic head as defined in claim 11, wherein said third magnetic films are divided.

14. The thin film magnetic head as defined in claim 11, further comprising a reading element comprised of a giant magnetoresistive effective film.

15. A magnetic head device comprising a thin film magnetic head as defined in claim 11 and a head supporting device to support said thin film magnetic head.

16. A magnetic recording/reproducing device comprising a magnetic head device as defined in claim 15 and a magnetic recording medium to be magnetically written and read with cooperated with said magnetic head device.

17. The thin film magnetic head as defined in claim 12, further comprising a reading element comprised of a giant magnetoresistive effective film.

18. The thin film magnetic head as defined in claim 13, further comprising a reading element comprised of a giant magnetoresistive effective film.

19. A magnetic head device comprising a thin film magnetic head as defined in claim 12 and a head supporting device to support said thin film magnetic head.

20. A magnetic head device comprising a thin film magnetic head as defined in claim 13 and a head supporting device to support said thin film magnetic head.

21. A magnetic head device comprising a thin film magnetic head as defined in claim 14 and a head supporting device to support said thin film magnetic head.

* * * * *